United States Patent
Bertin et al.

(10) Patent No.: US 6,294,942 B2
(45) Date of Patent: *Sep. 25, 2001

(54) METHOD AND APPARATUS FOR PROVIDING SELF-TERMINATING SIGNAL LINES

(75) Inventors: Claude L. Bertin, South Burlington; Anthony R. Bonaccio, Shelburne; Howard Kalter, Colchester; William R. Tonti, Essex Junction, all of VT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,930

(22) Filed: Mar. 9, 1999

(51) Int. Cl.[7] ............................. H03K 5/08; H03L 5/00
(52) U.S. Cl. ................................. 327/327; 326/30; 326/86
(58) Field of Search ........................ 327/309, 310, 327/313, 327, 328; 326/30, 82, 86

(56) References Cited

U.S. PATENT DOCUMENTS

| | | |
|---|---|---|
| 5,166,561 | 11/1992 | Okura ............................. 327/312 |
| 5,227,677 | 7/1993 | Furman ........................... 326/21 |
| 5,329,174 | 7/1994 | Chiang ........................... 327/313 |
| 5,374,861 * | 12/1994 | Kubista ........................... 326/30 |
| 5,530,377 | 6/1996 | Walls ............................. 326/30 |
| 5,534,811 | 7/1996 | Gist et al. ....................... 327/309 |
| 5,654,653 | 8/1997 | Coyle et al. ..................... 327/51 |
| 5,781,029 * | 7/1998 | Baran ............................. 326/30 |
| 6,026,456 * | 2/2000 | Ilkbahar .......................... 710/101 |

* cited by examiner

Primary Examiner—Terry D. Cunningham
Assistant Examiner—Quan Tra
(74) Attorney, Agent, or Firm—Schmeiser, Olsen & Watts; Mark F. Chadurjian

(57) ABSTRACT

A self-terminating module is provided that at least partially terminates a signal line when the self-terminating module is coupled thereto. The self-terminating module comprises an internal non-self-terminating module directly coupled to an internal termination circuit. Preferably an active internal termination circuit is employed. A pass circuit may be coupled between the internal termination circuit and the internal non-self-terminating module so as to pass a received signal therebetween with fewer reflected signal contributions. When a pass circuit is employed, a delay circuit responsive to a trigger signal controls signal transfer between the internal termination circuit and the internal non-self-terminating module. One or more self-terminating modules may be coupled to a signal line and the termination impedance of each module is selected to provide adequate signal line termination without significantly loading the signal line when one or more of the self-terminating modules are coupled thereto.

8 Claims, 7 Drawing Sheets

METHOD AND APPARATUS FOR PROVIDING SELF-TERMINATING SIGNAL LINES

FIELD OF THE INVENTION

The present invention relates to high speed signal networks and more specifically to a method and apparatus for providing self-terminating signal lines within a high speed signal network.

BACKGROUND OF THE INVENTION

To obtain maximum performance from a high speed signal network (e.g., a signal network between a microprocessor and various high speed components such as dynamic random access memory (DRAM), single data rate random access memory (SDRAM), double data rate random access memory (DDRAM), etc.), each signal line within the signal network is terminated with an impedance element (e.g., a resistor) that matches the characteristic impedance of the signal line when components are coupled thereto (i.e., the loaded line characteristic impedance of the signal line). Terminating a signal line with an impedance element that matches the signal line's loaded line characteristic impedance (i.e., impedance matching) prevents signal reflection as a signal travels down the signal line, and maximizes energy transmission efficiency. Further, impedance matching averts erroneous switching of other components coupled to the signal line due to signal reflections. If a signal line is loaded with bi-directional driver receivers, typically both ends of the signal line are terminated.

FIGS. 1A–3B show prior art methods of terminating a signal line. In FIG. 1A, a signal line 101 is resistively terminated by a resistor 103 coupled between the signal line 101 and ground. The resistor 103 matches the loaded line characteristic impedance of the signal line 101 (e.g., the characteristic impedance of the signal line 101 with the modules "M" coupled thereto). In FIG. 1B the signal line 101 is terminated by coupling the resistor 103 between the signal line 101 and a positive voltage rail ($V_{DD}$).

Both the termination configurations of FIGS. 1A and 1B function well at preventing signal reflection. However, both configurations dissipate substantial D.C. power. For example, the termination of FIG. 1A dissipates power when the signal level on the signal line 101 is high (e.g., $V_{DD}$) and the termination of FIG. 1B dissipates power when the signal level on the signal line 101 is low (e.g., 0 volts).

FIG. 2 shows a conventional series terminator 201 for terminating the signal line 101. The series terminator 201 comprises a series resistor 203 placed along the signal line 101 and a capacitor 205 connected (e.g., in parallel) between the signal line 101 and ground. The values for the series resistor 203 and the capacitor 205 are selected to provide the required termination for the signal line 101. The proper selection of the series resistor 203 and the capacitor 205 depend on the characteristics of the loaded signal line 101 (e.g., the package inductance 207 of the components coupled thereto), and changing the loading of the signal line 101 (e.g., by changing, adding or removing components) can cause the signal line 101 to respond worse to an incident signal than if the signal line 101 were not terminated.

FIG. 3A is a schematic diagram of an active terminator 301 that provides the advantages of both the termination configuration of FIG. 1A (e.g., resistive termination to ground) and the termination configuration of FIG. 1B (e.g., resistive termination to $V_{DD}$) without significant D.C. power consumption. The active terminator 301 comprises a plurality of complimentary metal-oxide-semiconductor (CMOS) inverters, specifically a first CMOS inverter 303 coupled to a second CMOS inverter 305. The input of the first CMOS inverter 303 is coupled to the output of the second CMOS inverter 305 at a terminal A, and the output of the first inverter 303 is coupled to the input of the second inverter 305.

FIG. 3B is a schematic diagram of the interconnected transistors forming the first and the second CMOS inverters 303, 305 of FIG. 3A. The first CMOS inverter 303 comprises a first p-channel transistor 307 (first PFET 307) having a source coupled to $V_{DD}$, a drain coupled to a node B and a gate coupled to the terminal A, and a first n-channel transistor 309 (first NFET 309) having a source coupled to ground, a drain coupled to the node B and a gate coupled to the terminal A. The second CMOS inverter 305 comprises a second p-channel transistor 311 (second PFET 311) having a source coupled to $V_{DD}$, a drain coupled to the terminal A and a gate coupled to the node B, and a second n-channel transistor 313 (second NFET 313) having a source coupled to ground, a drain coupled to the terminal A and a gate coupled to the node B.

In operation, assume initially that no signal is present on the terminal A so that the terminal A is at 0 volts. With the terminal A at 0 volts, the first PFET 307 is ON, and the first NFET 309 is OFF and the node B is pulled to $V_{DD}$. With the node B at $V_{DD}$, the second PFET 311 is OFF and the second NFET 313 is ON. With the second NFET 313 ON, the signal line 101 is effectively terminated to ground via the resistor formed by the channel of the second NFET 313 (similar to the resistive terminator of FIG. 1A). Accordingly, the dimensions of the second NFET 313 are selected so that the channel resistance of the second NFET 313 matches the loaded line characteristic impedance of the signal line 101. No D.C. current flows as terminal A is at 0 volts.

Thereafter assume a high voltage signal $V_S$ (e.g., $V_S=V_{DD}$) is incident on the active terminator 301. Because the signal line 101 is terminated to ground, no portion of $V_S$ is reflected. However, D.C. current can flow from the terminal A to ground (via the second NFET 313) and absent the operation of the active terminator 301 (described below) D.C. power would be wasted.

In response to the high voltage $V_S$, the first PFET 307 turns OFF, the first NFET 309 turns ON and the node B is pulled to ground. In response thereto, the second PFET 311 turns ON, the second NFET 313 turns OFF. With the second PFET 311 ON, and the signal line 101 is effectively terminated to $V_{DD}$ via the resistor formed by the channel of the second PFET 311 (e.g., similar to the resistive terminator of FIG. 1B). Accordingly, the dimensions of the second PFET 311 are selected so that the channel resistance of the second PFET 311 matches the loaded line characteristic impedance of the signal line 101.

With the second PFET 311 ON, the signal line 101 remains effectively terminated to $V_{DD}$, and D.C. current can no longer flow between the terminal A and ground. Because of the rapid turn ON time of the second PFET 311 in response to a high voltage signal on the terminal A, negligible D.C. power is lost.

The active terminator 301 behaves similarly when the signal $V_S$ switches from a high voltage level to a low voltage level (e.g., ground). The first PFET 307 turns ON, the first NFET 309 turns OFF, the second PFET 311 turns OFF and the second NFET 313 turns ON. The signal line 101, therefore, is effectively terminated to ground, and negligible D.C. power is lost.

In terms of lower D.C. power consumption, the active terminator 301 is far superior to the passive resistive terminators of FIGS. 1A and 1B, and the active terminator 301 terminates more effectively than the passive series terminator of FIG. 2. However, all of the forms of terminations described in FIGS. 1A–3B, as well as other prior art techniques for improving signal line transmission 10 (e.g., output current shape control, feedback circuits to adjust rise/fall times, limited swing terminations, etc.), require additional signal network components that consume valuable card space and that increase manufacturing costs (e.g., purchasing cost, storage cost, cost of placing the components on cards, etc.)

Accordingly, a need exists for a method and apparatus that provides effective signal line termination within a signal network without consuming significant D.C. power and without requiring extra terminating components that consume valuable card space.

SUMMARY OF THE INVENTION

To address the needs of prior art termination circuitry, a self-terminating module is provided that at least partially terminates a signal line when the self-terminating module is coupled thereto. As used herein, "partially terminates" means intentionally terminates so as to reduce signal reflections and does not include unintentional termination that may occur when a conventional, non-self-terminating module is connected to a signal line. A signal line terminated by one or more of the inventive self-terminating modules is a "self-terminating line".

The inventive self-terminating module comprises an internal non-self-terminating module (e.g., any conventional module such as a memory module or some other integrated circuit having a data input circuit, a data output circuit or a data input/output circuit) directly connected to an internal termination circuit. As used herein, "directly conneted" means not connected via the signal line to be terminated by the self-terminating module. Preferably the internal termination circuit is formed on the same semiconductor chip as the internal non-self-terminating module so as to reduce the space consumed by the internal termination circuit and its connections to the internal non-self-terminating module. An active internal termination circuit is preferred (e.g., to reduce the power consumption associated with the internal termination circuit's operation).

If a self-terminating module's internal non-self-terminating module includes a data input circuit, a pass circuit (e.g., a pass gate) may be provided between the internal termination circuit and the data input circuit so as to pass a received signal therebetween with fewer reflected signal contributions. A delay circuit (e.g., a one-shot) coupled to a control terminal of the pass gate controls the operation of the pass gate. Specifically, in response to a trigger signal (e.g., a clock signal, an address signal, etc.), the delay circuit outputs a control signal to the pass gate's control terminal for a predetermined time period, after a predetermined delay. In response thereto, the pass gate allows a signal to travel between the internal termination circuit and the data input circuit for the duration of the control signal. The predetermined time period and the predetermined delay for the control signal preferably are electronically selectable.

When only one self-terminating module is connected to a signal line (e.g., in a point-to-point signal network), the module's internal termination circuit preferably terminates the signal line with the signal line's loaded line characteristic impedance. If multiple self-terminating modules are connected to a signal line, each module's internal termination circuit terminates the signal line with an impedance (i.e., a terminating impedance) higher than the signal line's loaded line characteristic impedance so as to reduce loading of the signal line by the multiple self-terminating modules coupled thereto. Preferably the terminating impedance of each self-terminating module may be electronically selected.

By employing the self-terminating modules, effective signal line termination is provided at each load point in a signal network without consuming significant D.C. power and without requiring external termination circuitry that consumes valuable card space. Note that an external termination may be required on the end of a signal line if the distance between the end of the signal line and the self-terminating module closest thereto exceeds a critical distance.

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 4:
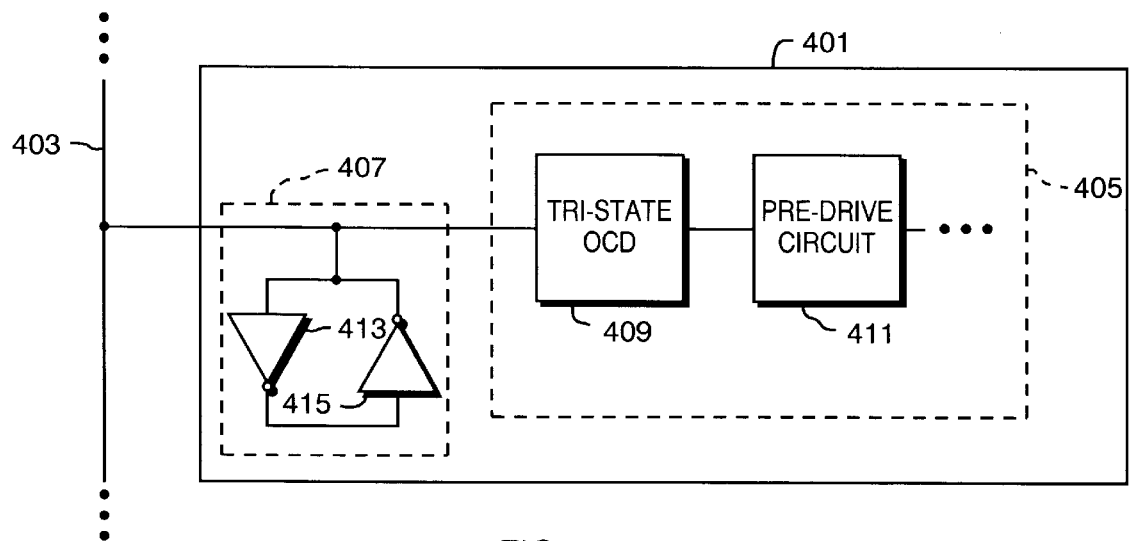
FIG. 4 is a schematic diagram of a first self-terminating module configured in accordance with the present invention.

FIG. 4 is a schematic diagram of a first self-terminating module 401 configured in accordance with the present invention. The first self-terminating module 401 is shown coupled to a signal line 403, and at least partially terminates the signal line 403 as described below.

The first self-terminating module 401 comprises a first internal non-self-terminating module 405 directly connected to a first internal termination circuit 407. The first internal termination circuit 407 preferably is formed on the same semiconductor chip as the first internal non-self-terminating module 405 so as to reduce the space consumed by the first internal termination circuit 407 and its connections to the first internal non-self-terminating module 405.

The first internal non-self-terminating module 405 may comprise any conventional module that connects to a signal line such as a DRAM, an SDRAM, a DDRAM or any other integrated circuit. The first internal non-self-terminating module 405 of FIG. 4 is a data output module and comprises a tri-state off-chip driver (OCD) 409 and a pre-drive circuit 411 for driving a data signal on the signal line 403 as is well known in the art. The tri-state OCD 409 has an input coupled to the output of the pre-drive circuit 411 for receiving a data signal output therefrom, and an output coupled to the signal line 403 for driving the received data signal thereon.

Figure 1A:
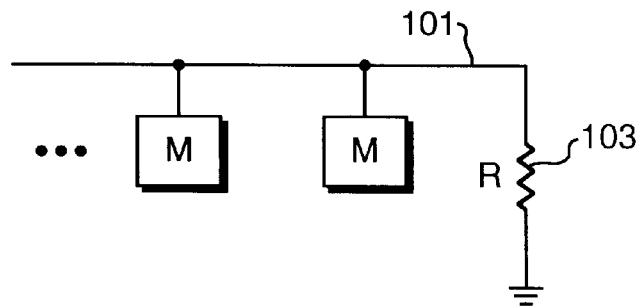
FIGS. 1A and 1B are schematic diagrams of conventional resistive terminators comprising a resistor coupled between a signal line and ground and a resistor coupled between a signal line and a voltage rail, respectively, as previously described.
Figure 1B:
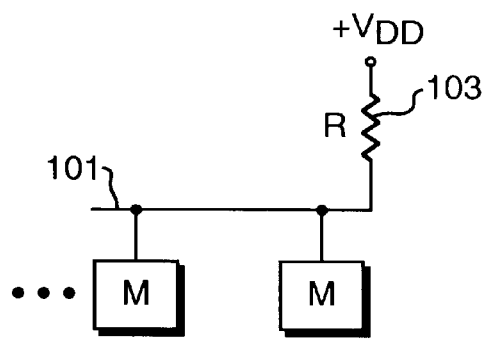
Figure 2:
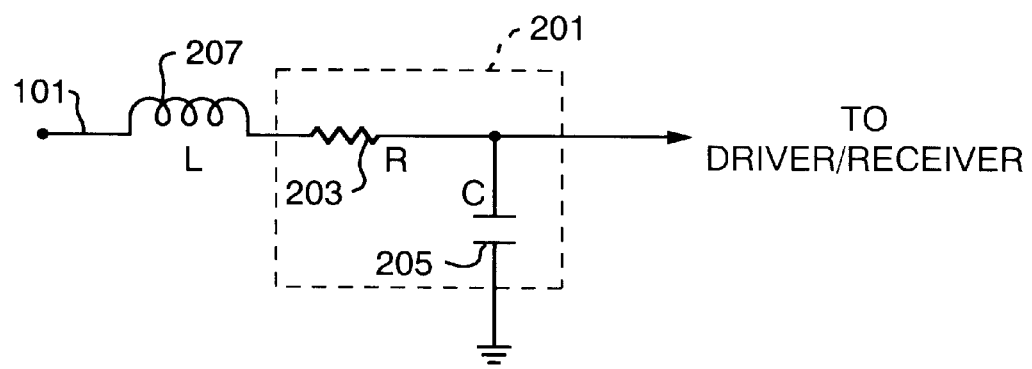
FIG. 2 is a schematic diagram of a conventional series terminator, as previously described.
Figure 3A:
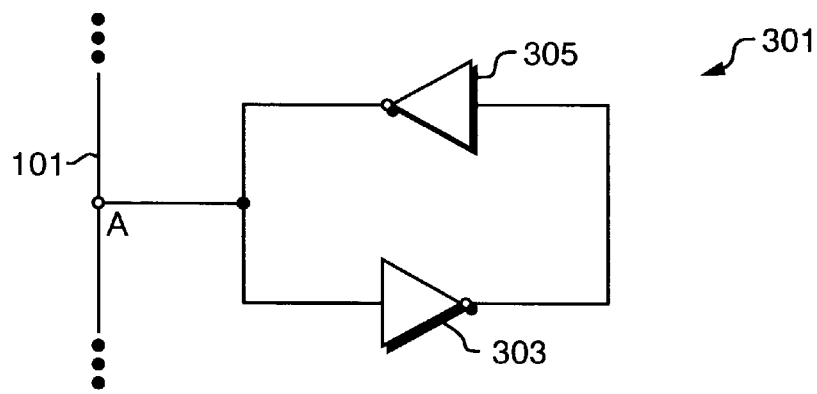
FIG. 3A is a schematic diagram of a conventional active terminator, as previously described.
Figure 3B:
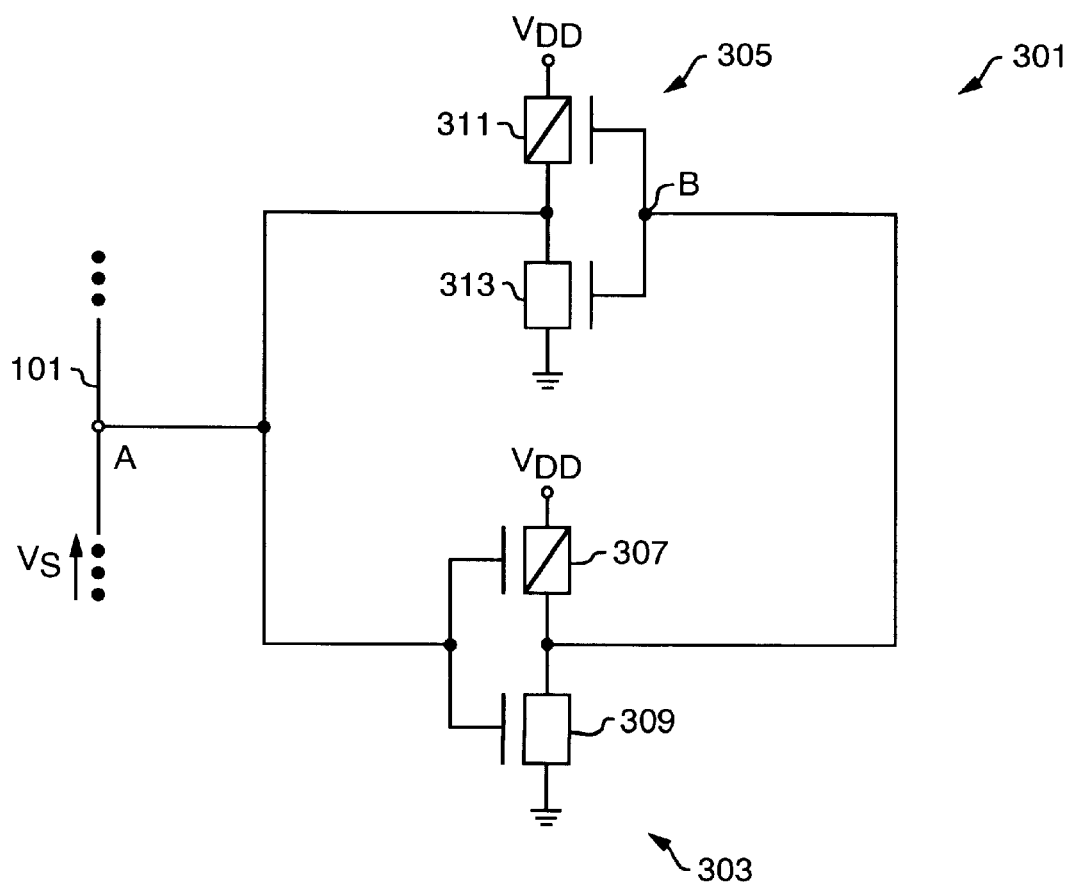
FIG. 3B is a schematic diagram of the interconnected transistors forming the active terminator of FIG. 3A, as previously described.

The first internal termination circuit 407 is an active terminator and comprises a first inverter 413 and a second inverter 415. The input of the first inverter 413 and the output of the second inverter 415 are coupled to the signal line 403, and the output of the first inverter 413 is coupled to the input of the second inverter 415. The first internal termination circuit 407 operates identically to the active terminator 301 of FIGS. 3A and 3B; namely, the output of the second inverter 415 controls the termination of the signal line 403 via an impedance (e.g., the channel resistance of a p-channel or an n-channel transistor similar to the second PFET 311 or the second NFET 313 of FIG. 3B) connected between either ground or $V_{DD}$ (as previously described).

When the first self-terminating module 401 is the only self-terminating module coupled to the signal line 403 (e.g., in a point-to-point signal network), the dimensions of the relevant n- and p-channel transistors (not shown) of the second inverter 415 are selected so that the channel resistance of each transistor matches the loaded line characteristic impedance of the signal line 403. However, when a plurality of the first self-terminating modules 401 are coupled to the signal line 403, the dimensions of the relevant n- and p-channel transistors of each first self-terminating module 401's second inverter 415 are selected so that the channel resistance of each transistor is higher than the signal line 403's loaded line characteristic impedance (e.g., to reduce loading of the signal line 403 by the plurality of the first self-terminating modules 401 coupled thereto as described below with reference to FIG. 8).

Preferably the impedance of each first self-terminating module 401 (and of the self-terminating modules 501, 601 described below with reference to FIGS. 5 and 6) may be varied using special select modes of the module. For 30 example, transistors of varying width can be placed in parallel and selected or de-selected to set the termination impedance of each self-terminating module 401. Means for performing such selective termination are described in commonly assigned U.S. patent application Ser. No. 09/146,834, filed Sep. 3, 1998, which is hereby incorporated by reference herein in its entirety.

Figure 5:
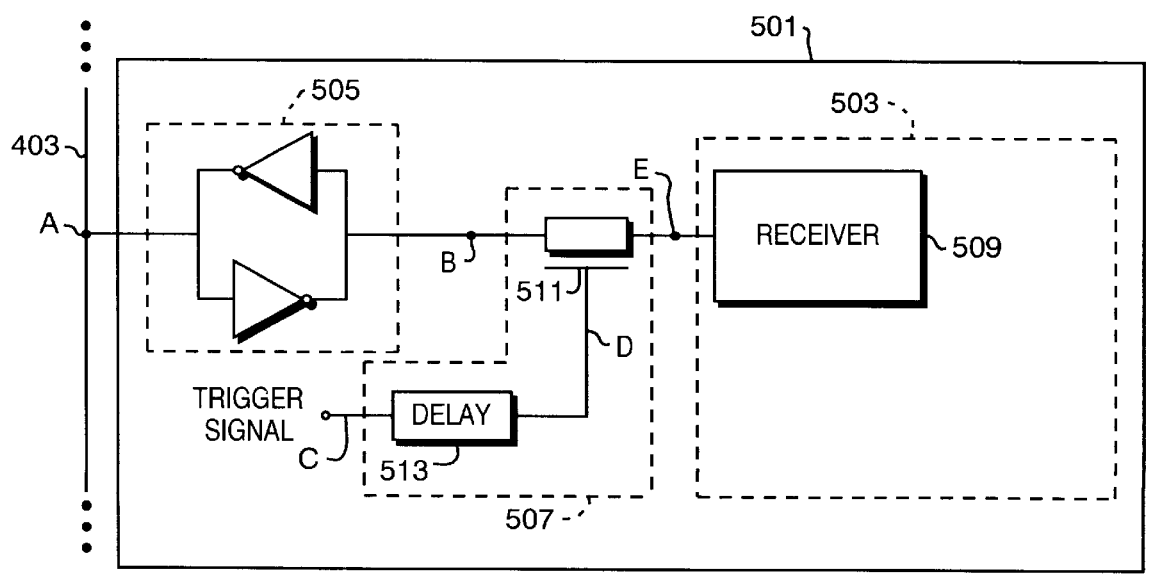
FIG. 5 is a schematic diagram of a second self-terminating module configured in accordance with the present invention.

FIG. 5 is a schematic diagram of a second self-terminating module 501 comprising a second internal non-self-terminating module 503 coupled to a second internal termination circuit 505 via a pass circuit 507. The second self-terminating module 501 is shown coupled to the signal line 403.

The second internal non-self-terminating module 503 of FIG. 5 is a data input module and comprises a receiver 509 for receiving a signal from the signal line 403 as is well known in the art. The receiver 509 has an input coupled to the signal line 403 via both the second internal termination circuit 505 and the pass circuit 507 for receiving a signal therefrom as described below.

The second internal termination circuit 505 of FIG. 5 is identical to the first internal termination circuit 407 of FIG. 4. However, unlike the first internal termination circuit 407, the second internal termination circuit 505 is connected in series between the pass circuit 507 (connected to the second internal non-self-terminating module 503) and the signal line 403 (e.g., to take advantage of the filtering properties of the second internal termination circuit 505 as described below with reference to FIG. 7A). The second internal termination circuit 505 behaves identically to the active termination 301 of FIGS. 3A and 3B, and the termination impedance provided by the second internal termination circuit 505 is either equal to (e.g., in point-to-point signal network applications) or higher than (e.g., in multiple self-terminating module applications) the loaded line characteristic impedance of the signal line 403 (as previously described).

The pass circuit 507 coupled between the second internal termination circuit 505 and the second internal non-self-terminating module 503 comprises a pass gate 511 having an input coupled to the second internal termination circuit 505, an output coupled the receiver 509 and a gate coupled to an output of a delay circuit 513. The pass gate 511 may comprise any known pass gate (e.g., an n-channel or p-channel transistor), and the delay circuit 513 may comprise any known delay circuit (e.g., a one-shot).

The input of the delay circuit 513 is responsive to a trigger signal (e.g., a clock signal, an address signal, etc.) and in response thereto generates an output pulse of a predetermined duration, after a predetermined delay. The output pulse biases the gate of the pass gate 511 so as to generate a conducting path between the second internal termination circuit 505 and the second internal non-self-terminating module 503 during the output pulse's duration. As described further below with reference to FIGS. 7A and 7B, the predetermined duration and the predetermined delay of the delay circuit 513's output pulse are selected so as to pass a signal between the second internal termination circuit 505 and the second internal non-self-terminating module 503 with fewer reflections.

Figure 6:
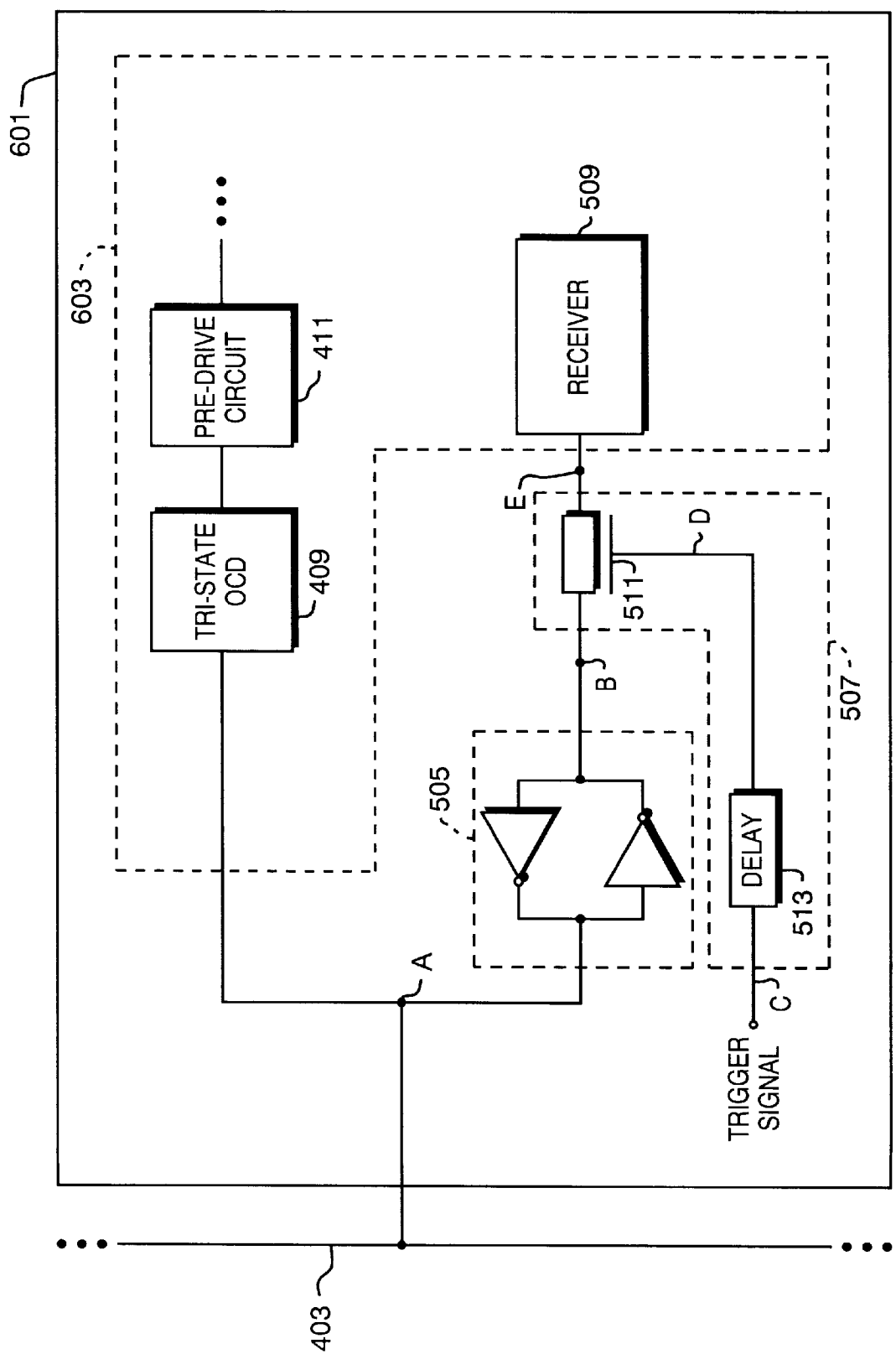
FIG. 6 is a schematic diagram of a third self-terminating module configured in accordance with the present invention.

FIG. 6 is a schematic diagram of a third self-terminating module 601 comprising a third internal non-self-terminating module 603, and the second internal termination circuit 505 and the pass circuit 507 of FIG. 5. Unlike the first internal non-self-terminating module 405 (FIG. 4) and the second internal non-self-terminating module 503 (FIG. 5), the third internal non-self-terminating module 603 of FIG. 6 is a data input/output module and comprises the tri-state OCD 409 and the pre-drive circuit 411 of FIG. 4 and the receiver 509 of FIG. 5.

Within the third self-terminating module 601, the output of the tri-state OCD 409 is coupled to the signal line 403, and the input of the receiver 509 is coupled to the signal line 403 via the second internal termination circuit 505 and the pass circuit 507. When in an output mode, the third self-terminating module 601 behaves the same as the first self-terminating module 401 of FIG. 4, and when in an input mode, the same as the second self-terminating module 501 of FIG. 5.

Figure 7A:
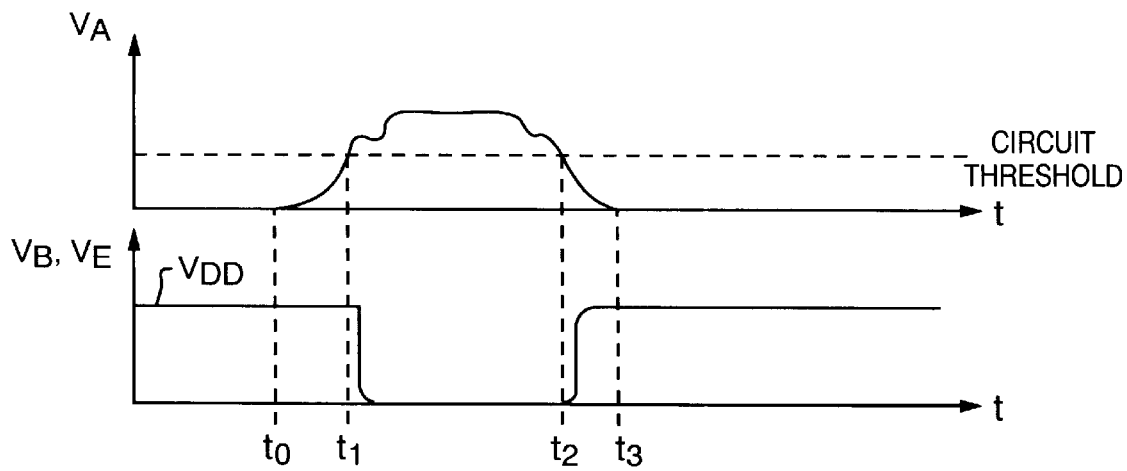
FIGS. 7A and 7B are timing diagrams useful in describing the operation of the self-terminating modules of FIGS. 5 and 6 with and without a pass circuit, respectively.
Figure 7B:
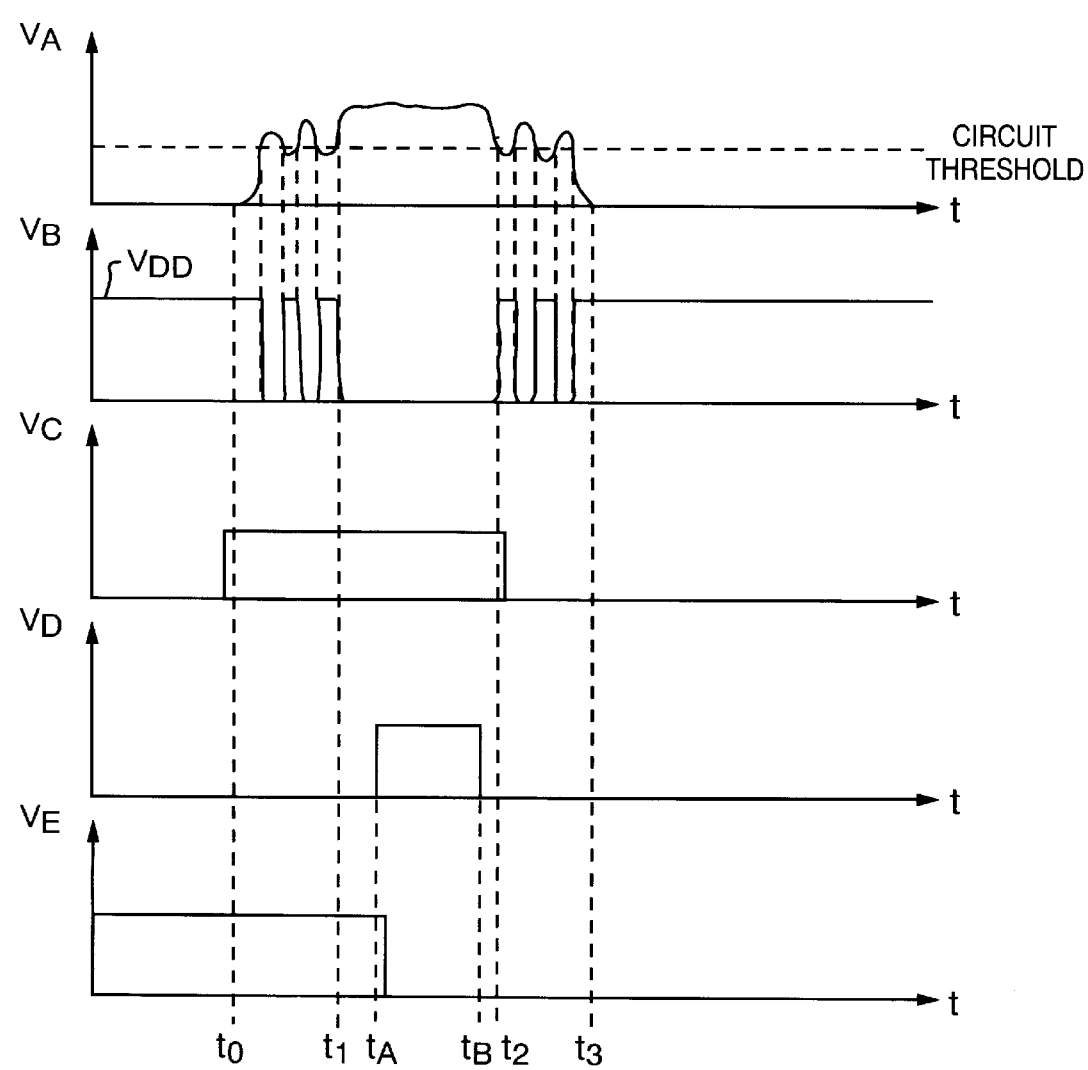

FIGS. 7A and 7B are timing diagrams useful in explaining the operation of the second self-terminating module 501 of FIG. 5 and the third self-terminating module 601 of FIG. 6 during a data input operation with the pass circuit 507 absent and the pass circuit 507 present, respectively. With reference to FIG. 7A, when a voltage signal $V_S$ is driven on the signal line 403 by a driver (e.g., a processor not shown) for receipt by the receiver 509, the voltage signal $V_S$ reaches the node A where it sees the signal line termination provided by the second internal termination circuit 505.

If the signal line 403 is not too noisy (e.g., if the second internal termination circuit 505 provides adequate signal line termination), the voltage at node A (voltage VA) will be relatively well behaved as shown in FIG. 7A. Accordingly, the threshold voltage for each inverter within the second internal termination circuit 505 (i.e., circuit threshold) may be adjusted to "ignore" or filter any minor reflected signal contributions to the voltage $V_A$. The voltage at node B (voltage $V_B$), therefore, is free of these minor reflected signal contributions.

With reference to FIG. 7A, at time $t_0$, the voltage signal $V_S$ arrives at node A and the rising edge of the voltage $V_A$ begins. The voltage $V_B$ is at the voltage $V_{DD}$ (e.g., the inverse of $V_A$). At time $t_1$, the voltage $V_A$ reaches the circuit threshold for the second internal termination circuit 505. In response thereto, the second internal termination circuit 505 switches state (as described previously with reference to FIGS. 3A and 3B), and the voltage $V_B$ drops from $V_{DD}$ to zero volts (e.g., the inverse of the voltage $V_A$). Between times $t_1$, and $t_2$, the voltage $V_A$ oscillates slightly as shown, but remains above the second internal termination circuit 505's circuit threshold. The voltage $V_B$, therefore, remains unaltered at zero volts.

At time $t_2$, the voltage $V_A$ falls below the second internal termination circuit 505's circuit threshold, the second internal termination circuit 505 switches state, and the voltage $V_B$ raises to $V_{DD}$. Thereafter, at time $t_3$, the voltage $V_A$ drops to zero, and the voltage $V_B$ remains at $V_{DD}$.

Because the voltage $V_B$ is well behaved, the pass circuit 507 is not required to remove reflected signal contributions from the voltage $V_B$ before it enters the receiver 509 of either the second self-terminating module 501 or the third self-terminating module 601. Accordingly, the pass circuit 507 may be eliminated (e.g., "physically" eliminated by removing the pass circuit 507 or "electronically" eliminated by applying a D.C. voltage to the delay circuit 513 so as to permanently bias the pass gate 511, thereby creating a permanent conducting channel between the second internal termination circuit 505 and the receiver 509). The voltage at node E (voltage E), and thus the voltage received by the receiver 509, is the voltage B.

When the signal line 403 is noisy, however, the pass circuit 507 is required. For instance, if the signal $V_S$ contains large reflected signal contributions when it reaches the node A, the voltage $V_A$ may contain oscillating components which traverse the second internal termination circuit 505's circuit threshold as shown in FIG. 7B.

With reference to FIG. 7B, at time $t_0$, the voltage signal $V_S$ arrives at node A and the rising edge of the voltage $V_A$ begins. Between times $t_0$ and $t_1$, as the voltage $V_A$ rises toward its peak value, the voltage $V_A$ oscillates due to reflected signal contributions. These voltage oscillations repeatedly traverse the second internal termination circuit 505's circuit threshold so as to repeatedly switch the state of the second internal termination circuit 505. Accordingly, between times to and $t_1$ the voltage $V_B$ repeatedly switches between 0 volts and $V_{DD}$ as shown.

Between times, $t_1$ and $t_2$, the voltage $V_A$ remains above the second internal termination circuit 505's circuit thresh-old. The voltage $V_B$, therefore, remains at zero volts therebetween. Thereafter, between times $t_2$ and $t_3$, the voltage $V_A$ oscillates as it drops to zero volts. These voltage oscillations repeatedly traverse the second internal termination circuit 505's circuit threshold and the voltage $V_B$ repeatedly switches between 0 volts and $V_{DD}$ as shown. Following time $t_3$, the voltage $V_A$ remains at zero volts, and the voltage $V_B$ remains at $V_{DD}$.

To prevent the receiver 509 from receiving the false transitions (and thus responding erroneously thereto) within the voltage $V_B$ due to reflected signal contributions, the pass circuit 507 is employed. Specifically, at some time before or around $t_0$, a timing signal such as a clock signal, an address signal, etc., is applied to the delay circuit 513 of the pass circuit 507 (voltage $V_C$ in FIG. 7B). In response thereto, the delay circuit 513 emits a voltage pulse between times $t_A$ and $t_B$ (e.g., of duration $t_B–t_A$ and delayed by about $t_A–t_0$) as shown by the voltage $V_D$ in FIG. 7B. The voltage VD biases the gate of the pass gate 511 so as to create a conducting channel between the second internal termination circuit 505 and the receiver 509 during the time period $t_A$ to $t_B$.

Only during the time period from $t_A$ to $t_B$ can the voltage $V_B$ travel to the receiver 509 (voltage E). Note that after time $t_B$, the voltage pulse output from the delay circuit 513 ends and the pass gate 511 turns OFF. As such, the voltage E can no longer track the voltage $V_B$ and the voltage E remains low. Through proper selection of the time periods $t_A$ to $t_B$ and $t_0$ to $t_A$ for the delay circuit 513's output pulse, only the portion of the voltage $V_B$ free from reflected signal contributions reaches the receiver 509 of either the second self-terminating module 501 or the third self-terminating module 601.

Figure 7C:
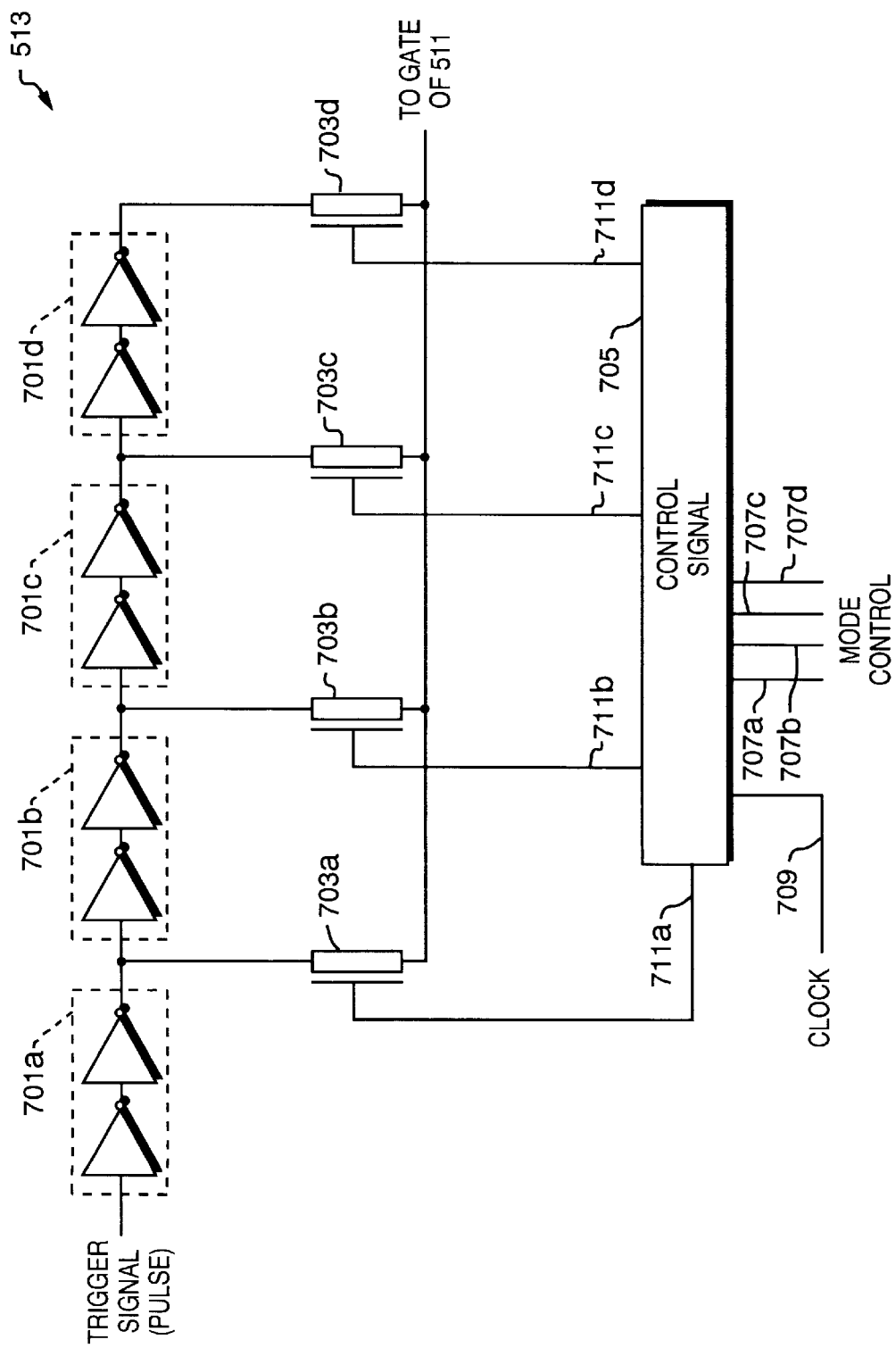
FIG. 7C is a schematic diagram of a delay circuit having an electronically selectable delay for use in the self-terminating modules of FIGS. 5 and 6.

FIG. 7C is a schematic diagram of a preferred embodiment for the delay circuit 513 that allows the delay circuit 513's delay to be electronically selected. Specifically, the delay circuit 513 of FIG. 7C comprises a plurality of series coupled inverter pairs 701a–d, a plurality of pass gates 703a–d coupled to the plurality of inverter pairs 701a–d and a control circuit 705 coupled to the plurality of pass gates 703a–d.

The first inverter pair 701a has an input that serves as the trigger signal input of the delay circuit 513, and an output coupled to the inputs of the second inverter pair 701b and the first pass gate 703a. The second inverter pair 701b has an output coupled to the inputs of the third inverter pair 701c and the second pass gate 703b, and the third inverter pair 701c has an output coupled to the inputs of the fourth inverter pair 701d and the third pass gate 703c. The output of the fourth inverter pair 701d is coupled to the input of the fourth pass gate 703d. The outputs of the pass gates 703a–d are coupled together and serve as the output of the delay circuit 513 (e.g., are coupled to the gate of the pass gate 511).

The control circuit 705 comprises a plurality of mode control inputs 707a–d, a clock input 709 and a plurality of outputs 711a–d. The outputs 711a–d of the control circuit 705 are coupled to the gates of the pass gates 707a–d, respectively, as shown in FIG. 7C.

In operation, the delay circuit 513 allows the selection of up to four different delays ranging from the propagation delay through the first inverter pair 701a (e.g., when the first pass gate 703a is ON and the pass gates 703b–d are OFF) to the propagation delay through all four inverter pairs 701a–d (e.g., when the fourth pass gate 703d is ON and the pass gates 703a–c are OFF).

To select the desired delay, mode control signals are supplied to the mode control inputs 707a–d. In response thereto, upon receiving a clock signal on the clock input 709, the control circuit 705 outputs to one of the pass gates 703a–d a voltage level that turns ON the pass gate and to the remaining pass gates a voltage level that turns OFF the pass gates. The particular pass gate turned ON is controlled by the voltages supplied to the mode control inputs 707a–d. Because only one pass gate 703a–d is ON at a time, the delay of the delay circuit 513 can range from the propagation delay of one inverter pair (if the first pass gate 703a is ON) to the propagation delay of four inverter pairs (if the fourth pass gate 703d is ON).

The delay circuit 513's delay for the self-terminating modules 501 and 601, and the impedance for the self-terminating module 401, 501 and 601, preferably are electronically adjustable as described above. The particular delay circuit 513 delay and the particular terminating impedance for each module depends on the number and the arrangement of self-terminating modules coupled to a signal line (e.g., one self-terminating module in a point-to-point application, a self-terminating module at every node of the signal line, a self-terminating module at every other node of the signal line, etc.). By providing an electrically adjustable delay for the delay circuit 513 and an electronically adjustable impedance for each self-terminating module, a signal line having one or more self-terminating modules coupled thereto may be adjusted to minimize reflections and to optimize signal line performance.

The delay and impedance settings for each self-terminating module configuration (e.g., point-to-point, a self-terminating module at every node of a signal line, etc.) may be stored in a non-volatile element such as a hard drive, an EEPROM module, etc., and each self-terminating module may be initialized at system start-up. Each self-terminating module also may store its own settings via an EPROM, an EEPROM, a fuse/latch, etc., without requiring access to a separate non-volatile element (e.g., a hard drive). For example, the control circuit 705 may be used to select the fuses blown within a self-terminating module so that when power is supplied to the self-terminating module, latches coupled to the mode control inputs 707a–d are automatically set. The delay of the delay circuit 513 thereby is automatically set without requiring signals external to the self-terminating module.

Figure 8:
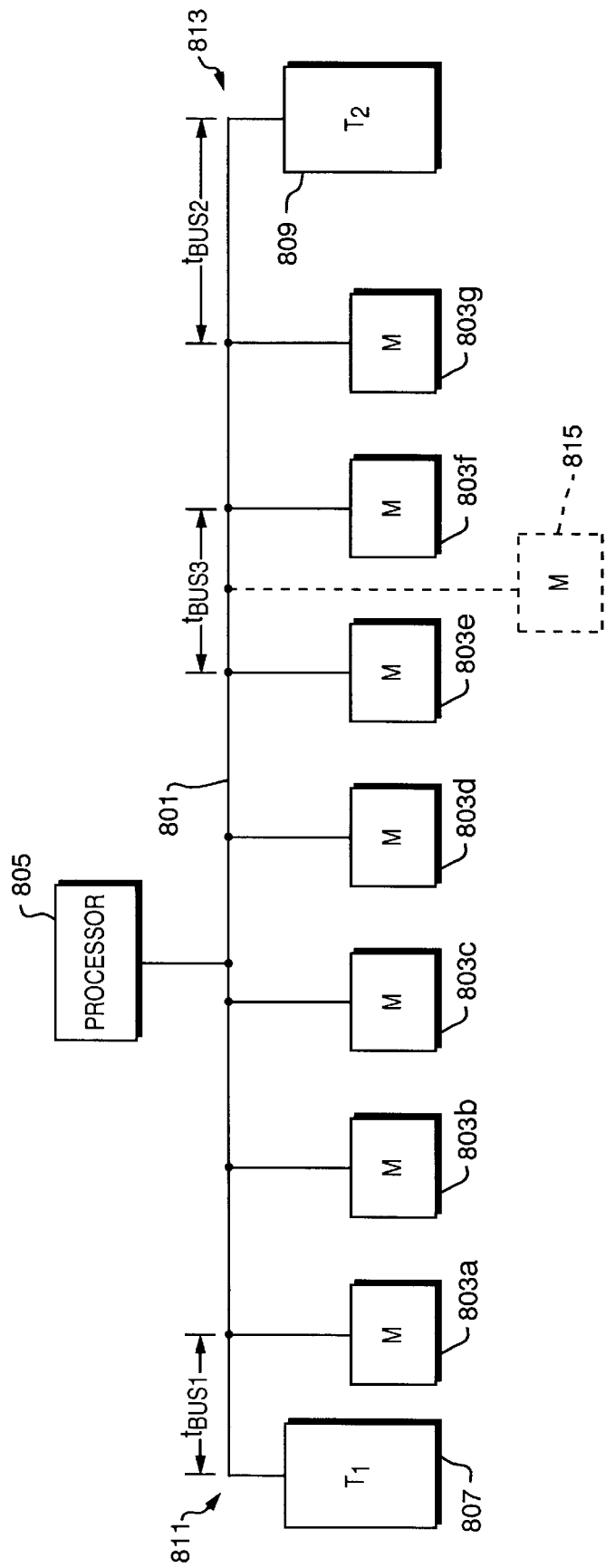
FIG. 8 is a schematic diagram of a signal line having a plurality of the inventive self-terminating modules of FIGS. 4–6 coupled thereto.

FIG. 8 is a schematic diagram of a signal line 801 30 having a plurality of the inventive self-terminating modules 803a–g coupled thereto. Each of the self-terminating modules 803a–g may comprise the first self-terminating module 401, the second self-terminating module 501 or the third self-terminating module 601 of FIGS. 4–6. A processor 805, a first terminator 807 and a second terminator 809 also are shown coupled to the signal line 801.

As previously stated, when only one self-terminating module is coupled to a signal line, the internal termination circuit of the module preferably terminates the signal line with the signal line's loaded line characteristic impedance ($Z_0$), where $Z_0 = (L/C)^{1/2}$, and where L and C are the inductance and the capacitance, respectively, of the signal line within the printed circuit board or card to which the self terminating module is coupled. However, when multiple self-terminating modules are coupled to a signal line such as in FIG. 8, each self-terminating module's internal termination circuit preferably terminates the signal line with an impedance higher than the signal line's loaded line characteristic impedance so as to reduce loading of the signal line by the multiple self-terminating modules coupled thereto. For instance, if the self-terminating modules add an additional capacitance component $C_M$ in parallel with the capacitance of the signal line within the printed circuit board, then the preferred impedance $Z_M$ of each self-terminating module is:

$$Z_M \geq (L/(C+C_M))^{1/2}$$

The impedance $Z_M$ for each module provides effective signal termination at each load point on the signal line without overloading the signal line. The plurality of self-terminating modules 803a–g, therefore, preferably each terminate the signal line 801 with an impedance calculated via equation (1).

With reference to FIG. 8, the signal line 801 may still require an external termination circuit on a first end 811 or a second end 813 of the signal line 801 for effective termination of the signal line 801. External termination of an end of the signal line 801 is required if the distance between the end of the signal line and the self-terminating module closest thereto (i.e., the end module) exceeds a "critical distance." Specifically, the critical distance ($d_c$) is the distance at which the round trip travel time ($2t_{BUS}$) of a signal between the end module and the end of the signal line exceeds the signal's rise time ($t_{RISE}$) or fall time ($t_{FALL}$). Therefore, an external termination is required on the end of a signal line if:

$$2t_{BUS} > t_{RISE} \text{ or } t_{FALL}$$

and the external termination circuit is not required if:

$$2t_{BUS} < t_{RISE} \text{ or } t_{FALL}$$

In FIG. 8, if $t_{BUS1}$ is the time required for a signal on the signal line 801 to travel from the module 803a to the first end 811 of the signal line 801, then the first terminator 807 is required only if:

$$2t_{BUS} < t_{RISE} \text{ or } t_{FALL}$$

where $t_{RISE}$ and $t_{FALL}$ are the signal's rise and fall times, respectively. Similarly, if $t_{BUS2}$ is the time required for the signal on the signal line 801 to travel from the module 803g to the second end 813 of the signal line 801, then the second terminator 809 is required only if:

$$2t_{BUS} > t_{RISE} \text{ or } t_{FALL}$$

Preferably the module 803a and the module 803g are located close enough to the first and the second ends 811, 813, respectively, to avoid use of the first and the second terminators 807, 809.

One or more non-self-terminating modules (such as the non-self-terminating module 815 shown in phantom in FIG. 8) also may be coupled to the signal line 801. If $t_{BUS3}$ is the time required for a signal on the signal line 801 to travel from the self-terminating module 803e to the self-terminating module 803f, then the non-self-terminating module 815 will be adequately terminated by the modules 803e, 803f if:

$$2t_{BUS} > t_{RISE} \text{ or } t_{FALL}.$$

Any number of non-self-terminating modules may be coupled between adjacent self-terminating modules 803a–g and properly terminated if the above condition is satisfied between each set of adjacent self-terminating modules. In this manner, properly employing the inventive self-terminating modules, effective signal line termination is provided at each load point in a signal network without consuming significant D.C. power and without requiring external termination circuitry that consumes valuable card space.

The foregoing description discloses only the preferred embodiments of the invention, modifications of the above disclosed apparatus and method which fall within the scope of the invention will be readily apparent to those of ordinary skill in the art. For instance, any termination circuit (e.g., active, passive, etc.) and any non-self-terminating module (e.g., a memory module, a logic module such as a processor, etc.) may be employed within the inventive self-terminating modules. Further, other pass circuits may be employed for the pass circuit 507 and other connection mechanisms known in the art may be employed to selectively vary the width and the delay of the voltage pulse output by the delay circuit 513, or to add/bypass the pass circuit 507.

Accordingly, while the present invention has been disclosed in connection with the preferred embodiments thereof, it should be understood that other embodiments may fall within the spirit and scope of the invention, as defined by the following claims.

The invention claimed is:

1. A self-terminating module comprising:
an internal non-self-terminating module;
an internal termination circuit directly connected to the internal non-self-terminating module for at least partially terminating a signal line when the self-terminating module is coupled to the signal line;
wherein the internal non-self terminating module further comprises a data output circuit; and
wherein the data output circuit comprises a tri-state OCD.

2. A self-terminating module comprising:
an internal non-self-terminating module including a data input circuit;
an internal termination circuit directly connected to the internal non-self-terminating module for at least partially terminating a signal line when the self-terminating module is coupled to the signal lines; and
a pass circuit coupled between the internal termination circuit and the internal non-self-terminating module, the pass circuit for allowing a signal to travel between the internal termination circuit and the internal non-self-terminating module in response to a control signal.

3. The self-terminating module of claim 3 further comprising:
a pass gate coupled between the internal termination circuit and the internal non-self-terminating module and having a control terminal, the pass gate for allowing a signal to travel between the internal termination circuit and the internal non-self-terminating module in response to a control signal; and
a delay circuit coupled to the control terminal of the pass gate for supplying the control signal to the control terminal for a predetermined time period after a predetermined delay in response to a trigger signal.

4. The self-terminating module of claim 3 wherein at least one of the predetermined time period and the predetermined delay are electronically selectable.

5. The self-terminating module of claim 3 wherein the predetermined time period and the predetermined delay are selected so as to pass a received signal transmitted over the signal line from the internal termination circuit to the internal non-self-terminating module with fewer reflected signal contributions when the self-terminating module is connected to the signal line.

6. A self-terminating module comprising:
an internal non-self-terminating module including a data input circuit;
an internal termination circuit directly connected to the internal non-self-terminating module for at least partially terminating a signal line when the self-terminating module is coupled to the signal lines;
a pass gate having a control terminal, the pass gate, for coupling between the internal termination circuit and the internal non-self-terminating module, and for allowing a signal to travel between the internal termination circuit and the internal non-self-terminating module in response to a control signal; and
a delay circuit coupled to the control terminal of the pass gate for supplying the control signal to the control terminal for a predetermined time period after a predetermined delay in response to a trigger signal.

7. A signal network comprising:
a signal line having a loaded line characteristic impedance;
a plurality of self-terminating modules coupled to the signal line, each self-terminating module terminating the signal line with a terminating impedance;
wherein each self-terminating module comprises an internal non-self-terminating module, and an internal termination circuit directly connected to the internal self-terminating module for at least partially terminating the signal line when the self-terminating module is coupled to the signal line;
said terminating impedance of each self-terminating module selected to reduce loading of the signal line by the plurality of self-terminating modules; and
wherein the terminating impedance of each self-terminating module is selected according to the formula:

$$Z_M \geq (L/\ (C+C_M)\ )^{1/2}$$

where $Z_M$ is the terminating impedance of each self-terminating module, L is the inductance and C is the capacitance of the signal line prior to coupling the self-terminating modules thereto, and CM is the additional capacitance component in parallel with the capacitance C when the self-terminating modules are coupled to the signal line.

8. A method of terminating a signal line comprising:
providing a signal line;
providing a plurality of self-terminating modules, each self-terminating module comprising an internal non-self-terminating module directly connected to an internal termination circuit for terminating the signal line with a terminating impedance so as to reduce loading of the signal line when the plurality of self-terminating modules are coupled to the signal line;
coupling the plurality of self-terminating modules to the signal line;
determining a rise time and a fall time of a signal to be transmitted on the signal line;
determining a round trip travel time of the signal between an end of the signal line and the self-terminating module closest to the end of the signal line; and
connecting an external termination circuit to the end of the signal line if the round trip travel time of the signal is greater than either the rise time or the fall time of the signal.

* * * * *